(12) United States Patent
Rosman et al.

(10) Patent No.: US 7,123,790 B2
(45) Date of Patent: Oct. 17, 2006

(54) SCANNING METHOD AND APPARATUS

(75) Inventors: Gavan Edmund Rosman, Camberwell (AU); Christopher Gerard Byrne, Rowville (AU); Bradley Charles Jones, Endeavour Hills (AU)

(73) Assignee: Optiscan Pty. Ltd., Notting Hill (AU)

( * ) Notice: Subject to any disclaimer, the term of this patent is extended or adjusted under 35 U.S.C. 154(b) by 0 days.

(21) Appl. No.: 10/533,440

(22) PCT Filed: Oct. 29, 2003

(86) PCT No.: PCT/AU03/01429

§ 371 (c)(1),
(2), (4) Date: Apr. 29, 2005

(87) PCT Pub. No.: WO2004/040267

PCT Pub. Date: May 13, 2004

(65) Prior Publication Data

US 2006/0013528 A1    Jan. 19, 2006

(51) Int. Cl.
*G02B 6/26* (2006.01)
*G02B 26/08* (2006.01)

(52) U.S. Cl. .................. 385/25; 359/202; 359/196

(58) Field of Classification Search ............ None
See application file for complete search history.

(56) References Cited

U.S. PATENT DOCUMENTS

| 5,241,364 | A  | * | 8/1993 | Kimura ................... 356/491 |
| 5,821,521 | A  | * | 10/1998 | Bridgelall et al. ..... 235/462.32 |
| 5,887,009 | A  | * | 3/1999 | Mandella et al. ............. 372/6 |
| 6,294,775 | B1 | * | 9/2001 | Seibel et al. ............ 250/208.1 |
| 2001/0055462 | A1 | * | 12/2001 | Seibel ..................... 385/147 |

FOREIGN PATENT DOCUMENTS

| DE | 19822869   | 11/1999 |
| WO | WO 00/23840 | 4/2000  |

* cited by examiner

*Primary Examiner*—Michelle Connelly-Cushwa
*Assistant Examiner*—Chris Chu
(74) *Attorney, Agent, or Firm*—Stites & Harbison PLLC; Douglas E. Jackson

(57) ABSTRACT

A scanning apparatus and method, the apparatus comprising: a light transmission means (90) having an exit tip; first and second drive means (92,94) for resonantly driving the light transmission means (90) in orthogonal directions; wherein the first and second drive means (92,94) are operable to move the tip in an elliptical pattern while varying the eccentricity of the elliptical pattern, whereby a portion of the elliptical pattern having a centre on the minor axis of the elliptical pattern approximates—at least in appearance—a raster pattern.

46 Claims, 10 Drawing Sheets

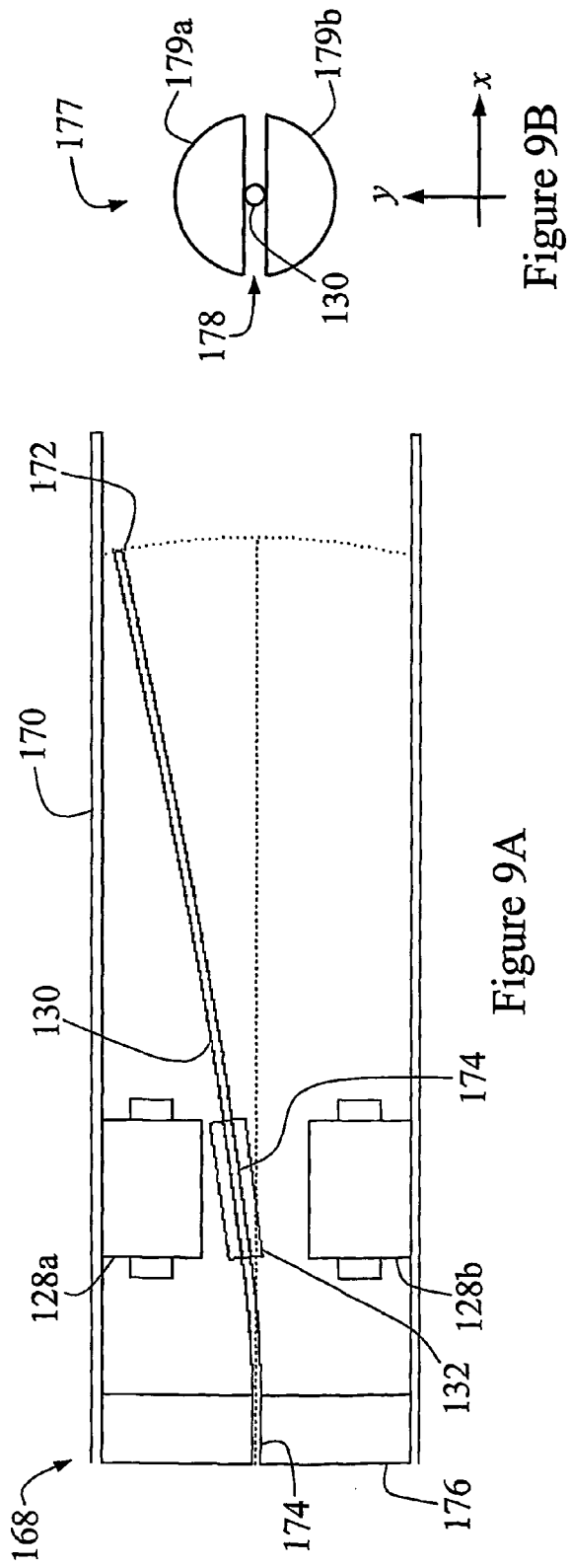
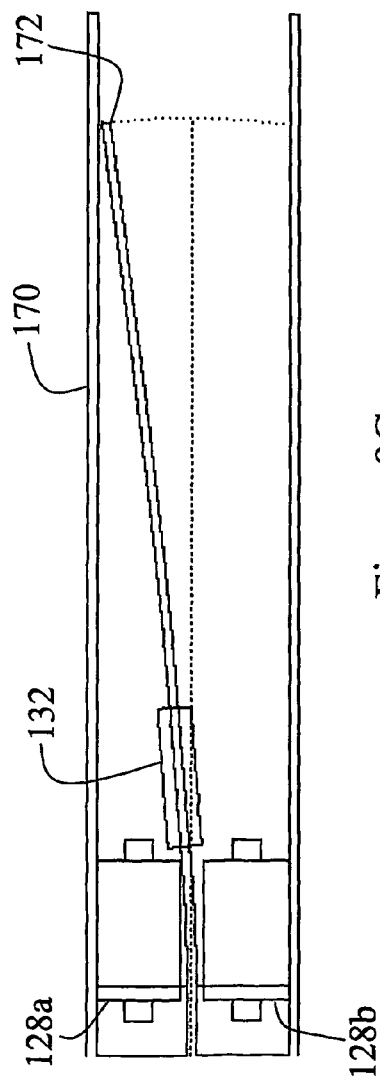
Figure 9A
Figure 9B
Figure 9C

SCANNING METHOD AND APPARATUS

FIELD OF THE INVENTION

The present invention relates to a scanning method and apparatus, of particular but by no means exclusive application in scanning fibre microscope and scanning fibre endoscopes.

BACKGROUND OF THE INVENTION

One existing scanning technique employs a resonant cantilever in order to achieve the high frequency scanning of an optical fibre tip, as a compact alternative to resonant mirror/galvanometer scanners. The high frequency or X scan is then combined with a slow or Y scan to produce a standard raster scanning pattern. The slow scan is usually not resonant and can have a sawtooth function, with relatively rapid retrace.

In such an arrangement, mechanical considerations require a resonant sinusoidal spot motion in the X or fast direction of the scan. Although a TV raster in both directions is more desirable (for optical dosage control and data gathering), a sawtooth scan at constant speed is feasible in only the slow or Y direction. As shown in FIG. 12, under practical conditions about half the scan area is available for data acquisition as indicated by the solid curves for a typical square image area. It is a matter of simple geometry to calculate that, at the end of the solid curves, the spot speed has fallen to 87% of the peak spot speed. The dotted portion of the scan, where spot speed is less than 87% of this maximum, is discarded. The 87% figure is derived from the 87% value for the maximum derivative of the cosine value. This value is somewhat arbitrary, but provides a basis for comparison between different scan patterns. The choice of 87% originates from the inventors' use of half of the amplitude of the sine wave for the raster scan, which corresponds to the $\geq 87\%$ of maximum speed section of the raster pattern. This is also regarded, based on the inventors' experience, as the acceptable region in terms of image quality without undue distortion.

Typically in existing systems, the Y mechanism is in tandem with the X deflection system and has similar length. However, as demand increases for ever more compact scanners there is a need to develop a combined XY scanner of shortest possible length. If the fibre can itself be deflected in both X and Y directions, as a symmetrical cantilever, the scanner is more compact. The problem is that for practical forces only resonant operation is feasible. For this reason modulated circular patterns have been developed, such as is disclosed in U.S. Pat. No. 6,294,775 (Seibel and Furness).

U.S. Pat. No. 6,294,775 discloses a system in which a fibre tip is typically moved in a circle or ellipse, the radius of which is then modulated so that an area is progressively scanned. Suitably phased X and Y drives can produce the circular motion, effectively resonant in both X and Y directions. However, the modulation of the radius of the scanning circle or ellipse results in a large variation in scanning speed, and a singularity at the centre of the field. This scan pattern is very different from a raster scan, so the resulting circular pattern requires image processing, creating interface problems with standard systems. One pattern that can be produced with the system of U.S. Pat. No. 6,294,775 is shown schematically in FIG. 13. Only that portion of the scan shown with a solid curve would be used for imaging. The portion of the scan shown with a dotted curve corresponds to a spot speed of less than 87% of the peak scan speed and is discarded. Hence most of the central area cannot be accessed. The solid curve again corresponds to a spot speed of $\geq 87\%$ of the peak spot speed which, in this spiral scan, corresponds to a radius of 87% of the maximum radius.

SUMMARY OF THE INVENTION

In a first broad aspect the present invention provides, therefore, a method of scanning a light transmission means having an exit tip, comprising moving said tip in an elliptical pattern while varying the eccentricity of said elliptical pattern.

Thus, one portion of the elliptical pattern (centred on the minor axis of the elliptical pattern) approximates—at least in appearance—a raster pattern.

Preferably the eccentricity is varied by varying the length of one axis of said elliptical pattern. More preferably the eccentricity is varied by varying the length of the minor axis of said elliptical pattern The central portion of an ellipse (either to one side of the major axis or spanning the major axis) approximates a rectangle, especially when that portion is narrow in the direction of the major axis, so—as the eccentricity of the elliptical pattern is varied—a scan pattern will result that approximates in appearance a raster pattern. Some barrel distortion will result, but this form of distortion can be tolerable or—if not—is relatively easily corrected by image processing. In any event, relative to the prior art modulation of radius technique, this distortion is small. The ellipse could even be a circle at its point of minimum eccentricity (that is, an ellipse with an eccentricity of zero), if—in certain applications—the resulting distortion were tolerable or correctable.

It should also be understood that the term light is used above to include all forms of electromagnetic radiation. Preferably the eccentricity is repeatedly varied between a minimum value and one. More preferably the eccentricity is repeatedly varied from a minimum value to one and then back to said minimum value, and said portion is centred on the centre of said elliptical pattern.

Preferably said elliptical pattern has a major axis and minor axis in the ratio of approximately two.

Preferably said method includes modulating said eccentricity by modulating the minor axis of said elliptical pattern between positive and negative extremes, so that said tip moves in both clockwise and counterclockwise directions in the course of a single complete scan.

Preferably said method includes driving said tip with an X drive parallel to the major axis of said elliptical pattern and with a Y drive parallel to the minor axis of said elliptical pattern, and synchronising at a constant phase to the X scan to allow interfacing to a standard raster display.

Preferably said Y drive is derived by synchronously switching a delayed version of said X drive.

For example, drive signals can be square waves, so any phase shifting can be accomplished by simple delay circuits.

Preferably said light transmission means is an optical fibre.

Preferably the method includes driving said light transmission means magnetically. More preferably the method includes driving said light transmission means by means of a magnet attached to said light transmission means, wherein said magnet is magnetised axially and acted on by mutually perpendicular coils or windings.

More preferably, said mutually perpendicular coils or windings comprise a pair of drive coils located symmetrically each on opposite sides of a rest position of said magnet in a first plane, and a further drive coil located in a second plane perpendicular to said first plane; and the method further comprises:

sensing the position of said magnet by means of a sensing coil located in said second plane symmetrically opposite said magnet from said further drive coil;
   obtaining an output signal from said sensing coil indicative of said position of said magnet; and
   deriving an input signal for said further drive coil from said output signal;
   wherein each of said pair of drive coils, said further drive coil, and said sensing coil are equidistant from said magnet in said rest position.

Preferably said method includes controlling a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, whereby a further scan can be performed perpendicular to said elliptical pattern.

In one embodiment, the light transmission means is provided with a coat of magnetic material. Alternatively, the light transmission means is located within a close-fitting magnetic tube.

These options permit the resonant frequency and length to be matched to design requirements.

In a second broad aspect, the present invention provides a scanning apparatus, comprising:

a light transmission means having an exit tip;
   first and second drive means for resonantly driving said light transmission means in orthogonal directions;
   wherein said first and second drive means are operable to move said tip in an elliptical pattern while varying the eccentricity of said elliptical pattern.

Preferably the apparatus is operable to vary said eccentricity by varying the length of one axis of said elliptical pattern. More preferably apparatus is operable to vary said eccentricity by varying the length of the minor axis of said elliptical pattern Preferably the apparatus is operable to repeatedly vary said eccentricity between a minimum value and one. More preferably the apparatus is operable to repeatedly said eccentricity from a minimum value to one and then back to said minimum value, wherein said portion is centred on the centre of said elliptical pattern.

Preferably said elliptical pattern has a major axis and minor axis in the ratio of approximately two.

Preferably said apparatus is operable to modulate said eccentricity by modulating the minor axis of said elliptical pattern between positive and negative extremes, so that said tip moves in both clockwise and counterclockwise directions in the course of a single complete scan.

Preferably the apparatus is operable to drive said tip with an X drive parallel to the major axis of said elliptical pattern and with a Y drive parallel to the minor axis of said elliptical pattern, and to synchronise at a constant phase to the X scan to allow interfacing to a standard raster display.

Preferably said Y drive is derived by synchronously switching a delayed version of said X drive.

Preferably said light transmission means is an optical fibre.

Preferably the apparatus includes a magnetic drive for driving said light transmission means. More preferably said magnetic drive includes a magnet attached to said light transmission means and mutually perpendicular coils or windings, wherein said magnet is magnetised axially and acted on by said mutually perpendicular coils or windings.

More preferably, said mutually perpendicular coils or windings comprise a pair of drive coils located symmetrically each on opposite sides of a rest position of said magnet in a first plane, and a further drive coil located in a second plane perpendicular to said first plane, and said apparatus further comprises a sensing coil for sensing the position of said magnet and located in said second plane symmetrically opposite said magnet from said further drive coil, wherein each of said pair of coils, said further coil and said sensing coil are equidistant from said magnet in said rest position, said sensing coil is operable to output an output signal indicative of said position of said magnet, and said apparatus is operable to derive an input signal for said further coil from said output signal.

Preferably said apparatus is operable to control a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, wherein said apparatus can perform a further scan perpendicular to said elliptical pattern.

The magnet can be in any suitable form. Hence, in one embodiment, the light transmission means is provided with a magnet in the form of a coat of magnetic material. Alternatively, the light transmission means is located within a magnet in the form of a close-fitting magnetic tube.

In a third broad aspect, the invention provides a scanning apparatus comprising:

an X drive for driving a light transmission means having an exit tip in an X direction;
   a Y drive for driving a light transmission means having an exit tip in a Y direction;
   an X drive input signal generator for providing an X drive input signal; and
   a Y drive input signal generator for providing a Y drive input signal modulated by a modulating signal derived from said X drive input signal;
   wherein said exit tip executes a scan pattern when driven simultaneously by said X drive and said Y drive.

Thus, with this scanning apparatus resonant and non-resonant scan patterns can be generated, including spiral patterns, figure eight scan patterns, and elliptical (including circular) scan patterns.

In a fourth broad aspect, the invention provides a scanning apparatus comprising:

an X drive for driving a light transmission means having an exit tip in an X direction;
   a Y drive for driving a light transmission means having an exit tip in a Y direction;
   an X drive input signal generator for providing a square wave X drive input signal; and
   a Y drive input signal generator for providing a Y drive input signal by generating a sawtooth signal and modulating said sawtooth signal with a modulating signal derived from said X drive input signal;
   wherein said exit tip executes a scan pattern when driven simultaneously by said X drive and said Y drive.

The following features are preferred in both the third and fourth broad aspects.

Preferably the scan pattern is elliptical and has an eccentricity that is always greater than zero (that is, the scan pattern has a non-circular envelope).

Preferably said Y drive input signal generator is operable to generate said sawtooth signal such that said sawtooth signal is repeatedly inverted according to a trigger signal comprising a delayed version of said X drive input signal.

Preferably said apparatus is operable to collect image data from a central portion of said scan pattern. More preferably said apparatus is operable to collect image data from a central portion of said scan pattern corresponding to an exit tip speed of greater than or equal to approximately 87% of a peak exit tip speed.

The invention also provides an optical fibre endoscope, microscope or endomicroscope comprising a scanning apparatus as described above.

BRIEF DESCRIPTION OF THE DRAWING

In order that the present invention may be more clearly ascertained, preferred embodiments will now be described, by way of example, with reference to the accompanying drawing, in which:

FIG. 9A is a partial cross-sectional view of an endoscope head provided with the apparatus of FIG. 7;

FIG. 9B is an end view of an optional collar for the optical fibre of the apparatus of FIG. 7;

FIG. 9C is a partial cross-sectional view of an endoscope head provided with a variation of the apparatus of FIG. 7;

DETAILED DESCRIPTION

Figure 1A:
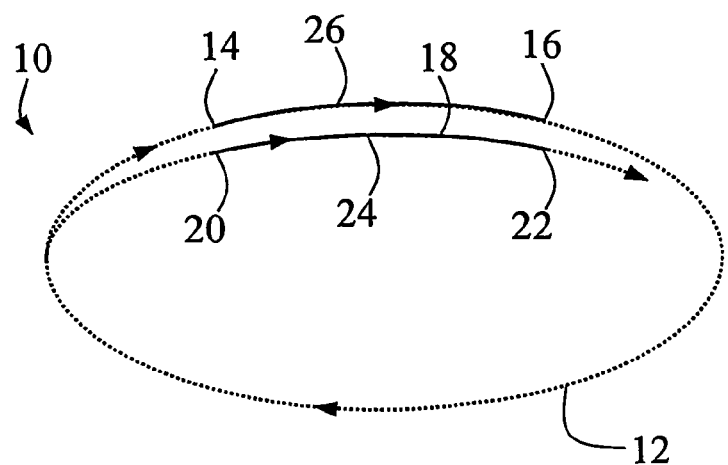
FIG. 1A is a schematic diagram of the start of an elliptical scan according to a first preferred embodiment of the present invention in which the scan commences clockwise.

An elliptical scan pattern according to a first preferred embodiment of the present invention is shown, soon after commencement, at 10 in FIG. 1A. In this figure (and in FIGS. 1B and 1C), a broken curve indicates those portions of this scan where no data acquisition is occurring; a solid curve indicates data acquisition.

The scan traces out a first ellipse 12 with a major axis twice the length of its minor axis (that is, with an eccentricity of approximately 0.87).

When the scan reaches the top, central region of ellipse 12 (that is, at point 14 to the left of the minor axis) data acquisition is triggered and continues to a comparable point 16 to the right of the centre of the ellipse 12 at which data acquisition is stopped. Thus, data is acquired over an arc with a length approximately equal to the semi-major axis of the ellipse 12. Although this arc has some curvature, this does not lead to an excessive level of distortion if processed as though it were straight. In addition, it is possible by conventional means to process any image collected by this technique to remove that distortion (producing thereby an image with curved upper and lower sides).

The first ellipse 12 is completed when its lower, fly-back section is traced. During non-data acquisition portions generally, either a light signal can be received but be discarded, or the source of light can be switched off or obscured so that in fact no data is generated.

The scan then proceeds, but with a lower Y drive signal so that the next ellipse (whose initial portion 18 is indicated in the figure) has the same major axis as the first ellipse 12, but a smaller minor axis and hence greater eccentricity. Data is acquired between points 20 and 22, which are aligned vertically with, respectively, points 14 and 16 of first ellipse 12. The resulting data acquisition trace 24 is consequently displaced downwards relative to the first data acquisition trace 26, and has a smaller curvature.

Figure 1B:
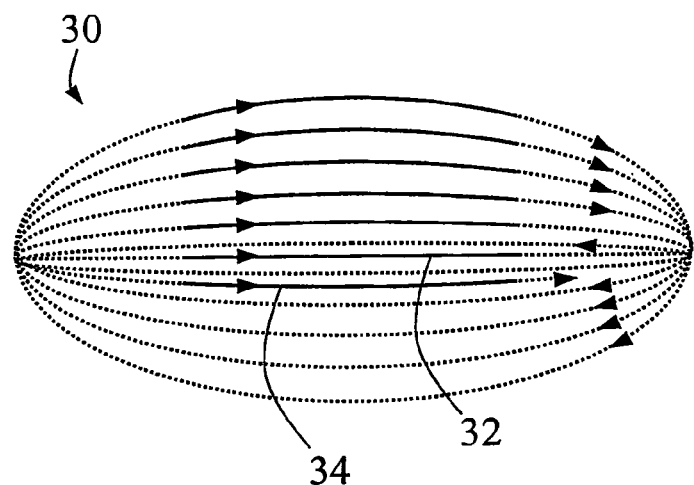
FIG. 1B is a schematic diagram of the scan of FIG. 1A just past its mid-point and now proceeding anti-clockwise.

The scan proceeds in this manner, with progressively decreasing Y drive signal, as shown in FIG. 1B at 30. Eventually, however, the Y drive signal equals or approximates zero and an essentially horizontal scan 32 results. The Y drive signal then reverses polarity and starts to increase while the X drive signal (essentially an unmodulated square wave of constant maximum amplitude) remains as before. The minor axis of the traces now increases, and the next trace 34 commences.

However, as a consequence the successive ellipses are now traced in an anti-clockwise direction; data is now acquired in the lower (i.e. left to right) portion of each of these traces so that, throughout the scan, data is acquired left to right, and fly-back (that, with no data acquisition) is right to left.

Figure 1C:
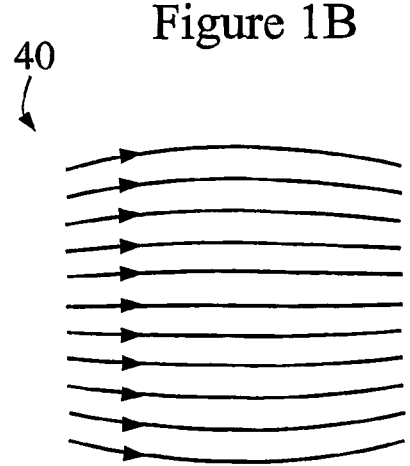
FIG. 1C is a schematic diagram of the data acquisition portion of one complete cycle of the scan of FIG. 1A.
Figure 13:
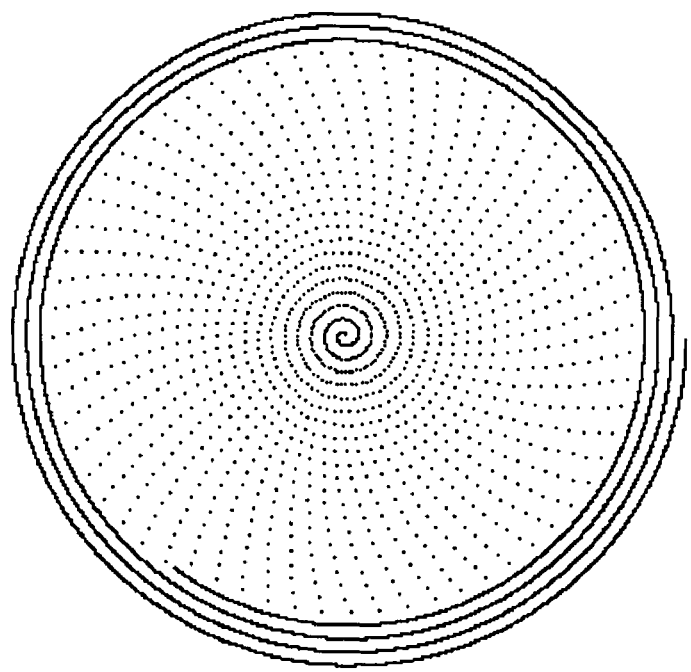
FIG. 13 is a schematic diagram of a prior art resonant X, sawtooth Y scan in which the solid curve indicates the imaged scan area and the dashed curve the discarded scan area.

Referring to FIG. 1C, eventually a complete, raster-like scan 40 is performed, after which the Y drive signal (by the end of the scan at its maximum amplitude) is switched in polarity to its original polarity and the process is repeated. The available scan area is of similar shape to the standard format. The main difference is the increasing curvature for high Y values. The central singular point of the prior art spiral scan (cf. FIG. 13) has been avoided, and a nearly square image area is available within the 87% spot speed rule.

Figure 2:
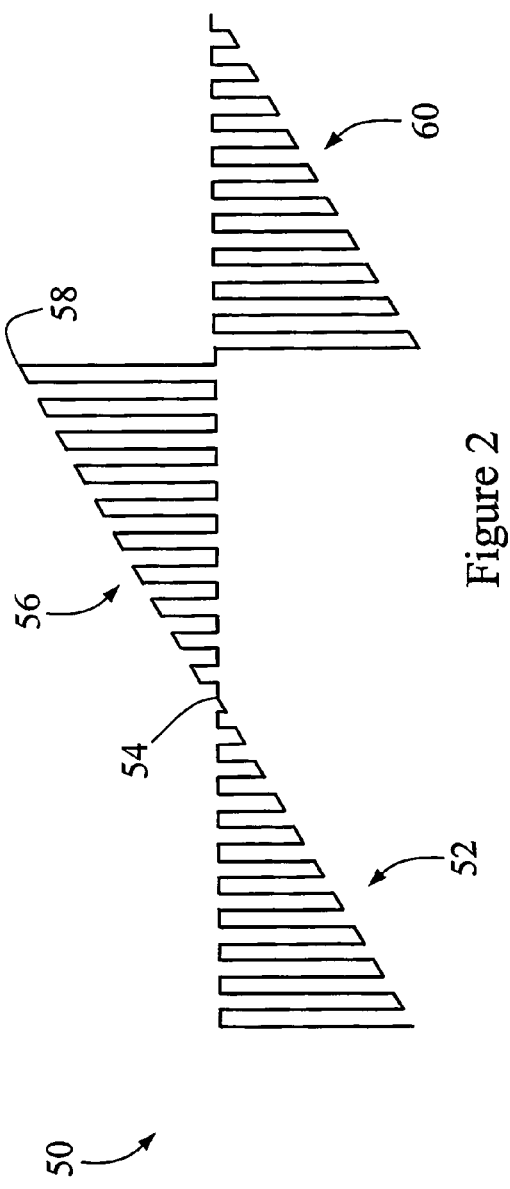
FIG. 2 is a schematic diagram of the Y drive signal used to produce the scan of FIG. 1A.

As mentioned above, the left to right or X drive signal is not modulated, but is conveniently a constant amplitude square wave that is also available to gate the Y drive signal. The Y drive signal is based on a standard raster scanner system signal with slow Y component, but the standard sawtooth signal is gated by a suitably delayed version of the X drive signal to produce the elliptical motion as discussed above. This Y drive signal is shown schematically at 50 in FIG. 2. As will be apparent from this figure, the envelope of this signal has a standard sawtooth form, but the Y drive signal is gated by the fast square wave X drive signal to produce the successive elliptical scans with progressively smaller then larger minor axes. Thus, the initial portion 52 corresponds to the clockwise scan portion discussed above by reference, in particular, to FIG. 1A. Eventually the essentially straight scan (scan 32 of FIG. 1B) is formed when the Y drive signal 50 is essentially zero at point 54. The polarity of the Y drive signal 50 is then changed and its magnitude increased through anti-clockwise portion 56 until a maximum amplitude 58 is reached, after which the whole sequence recommences. The amplitude of the next trace is maintained but is of reverse polarity so that a new clockwise scan 60 commences.

From the above discussion, it will be apparent that this modulation of the minor axis through positive and negative values produces a scan with no discontinuities at the centre of the field, unlike prior art approaches where the radius of the scan is modulated.

It will also be appreciated that an artifact of modulating the Y drive signal by means of the X drive signal is that each peak in the Y drive signal has an oblique rather than flat peak. This means that the elliptical scans will have some distortion, as the minor axis of each trace is changing in the course of that trace. This should generally be an insignificant effect, but if preferred, the Y drive signal 50 can be replaced with a signal in which each maximum is a square wave of progressively decreasing or increasing amplitude. Each successive ellipse would therefore be closer to an ideal ellipse. It is not expected, however, that the approximation represented by the trace of FIG. 2 would lead to any significant distortion to the ultimate raster scan or image.

Figure 3:
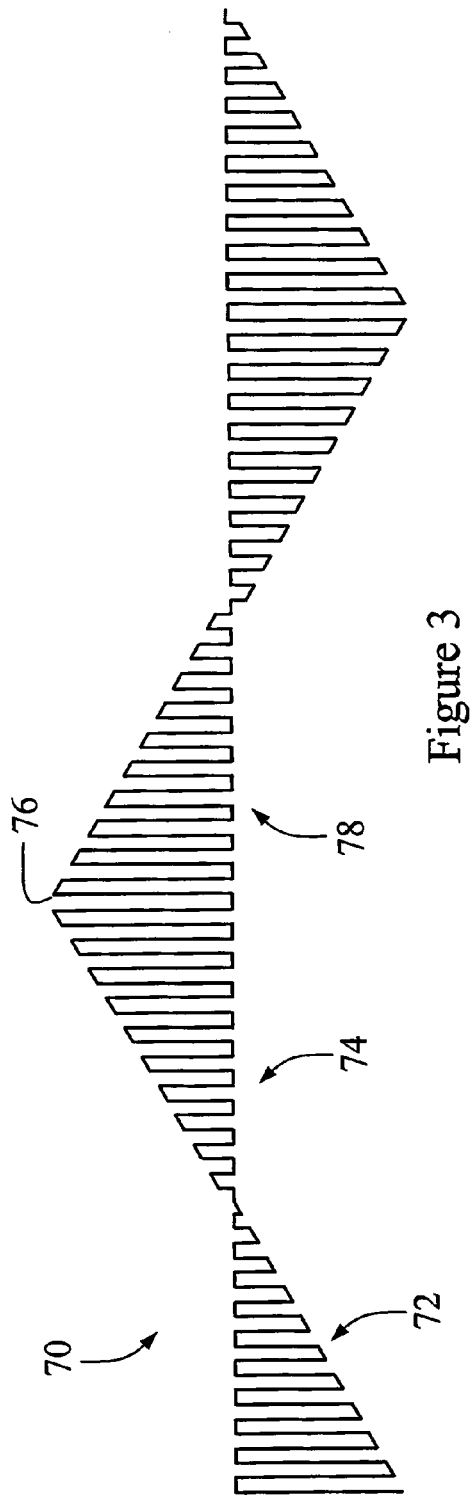
FIG. 3 is a schematic diagram of the Y drive signal used to produce a scan according to a second preferred embodiment of the invention.

A Y drive signal according to a second preferred embodiment is shown generally at 70 in FIG. 3. In this embodiment, when a single complete scan is being completed (that is, after clockwise traces 72 and anti-clockwise traces 74 [cf. traces 52 and 56 of FIG. 2] have been completed), the system does not jump back to the original configuration shown in FIG. 1A. Rather than switching the polarity of the Y drive signal 70 and commencing a new clockwise scan, the Y drive signal from maximum 76 onwards is ramped downwards so that another sequence of anti-clockwise traces 78 is performed. This is done by acquiring data during what was previously the fly-back period which, during the last anti-clockwise trace, resembles the first clockwise trace shown in FIG. 1A though in the opposite direction. Thus, by acquiring data during what would have been fly-back periods, a sequence of anti-clockwise traces 78 is performed and data is acquired. It will be appreciated that as a consequence successive complete raster scans alternate between left to right data collection (as shown, for example, in FIG. 1C) and right to left data collection.

Figure 4:
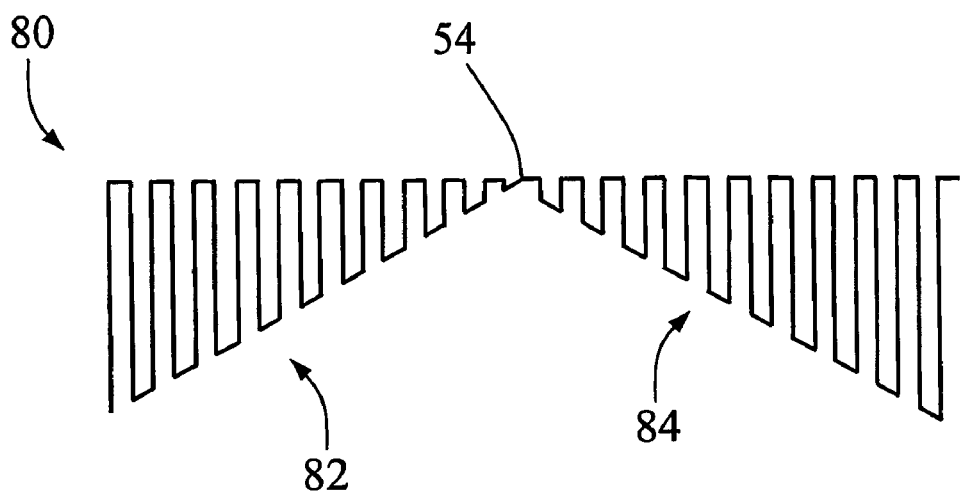
FIG. 4 is a schematic diagram of the Y drive signal used to produce a scan according to a third preferred embodiment of the invention.

In still another (or third) preferred embodiment, the Y scan signal 80 (see FIG. 4) is always of one polarity but comprises a first sequence of clockwise traces 82 with decreasing amplitude followed by a second sequence of clockwise traces 84 with increasing amplitude. In this embodiment, the traces proceed essentially as described with respect to FIG. 1A until the essentially horizontal trace is performed after which the same sequence of traces is performed in reverse order. Data is acquired during this second set of traces during what was the fly-back periods of the first set of traces 82. Consequently, the first set of traces 82 have data acquired from left to right, while the second set of traces 84 have data acquired from right to left.

It will be appreciated, therefore, that these and other variants can be used according to the present invention to collect a complete set of data, according to a user's equipment or other requirements. Indeed, in some embodiments it may be acceptable or desirable that the raster scan comprise essentially the upper half of the complete scan shown in FIG. 1C or, indeed, some other portion thereof. It will be appreciated that the number of individual traces within any particular raster scan can be determined according to requirements and that the above embodiments are purely illustrative in this respect.

Figure 5:
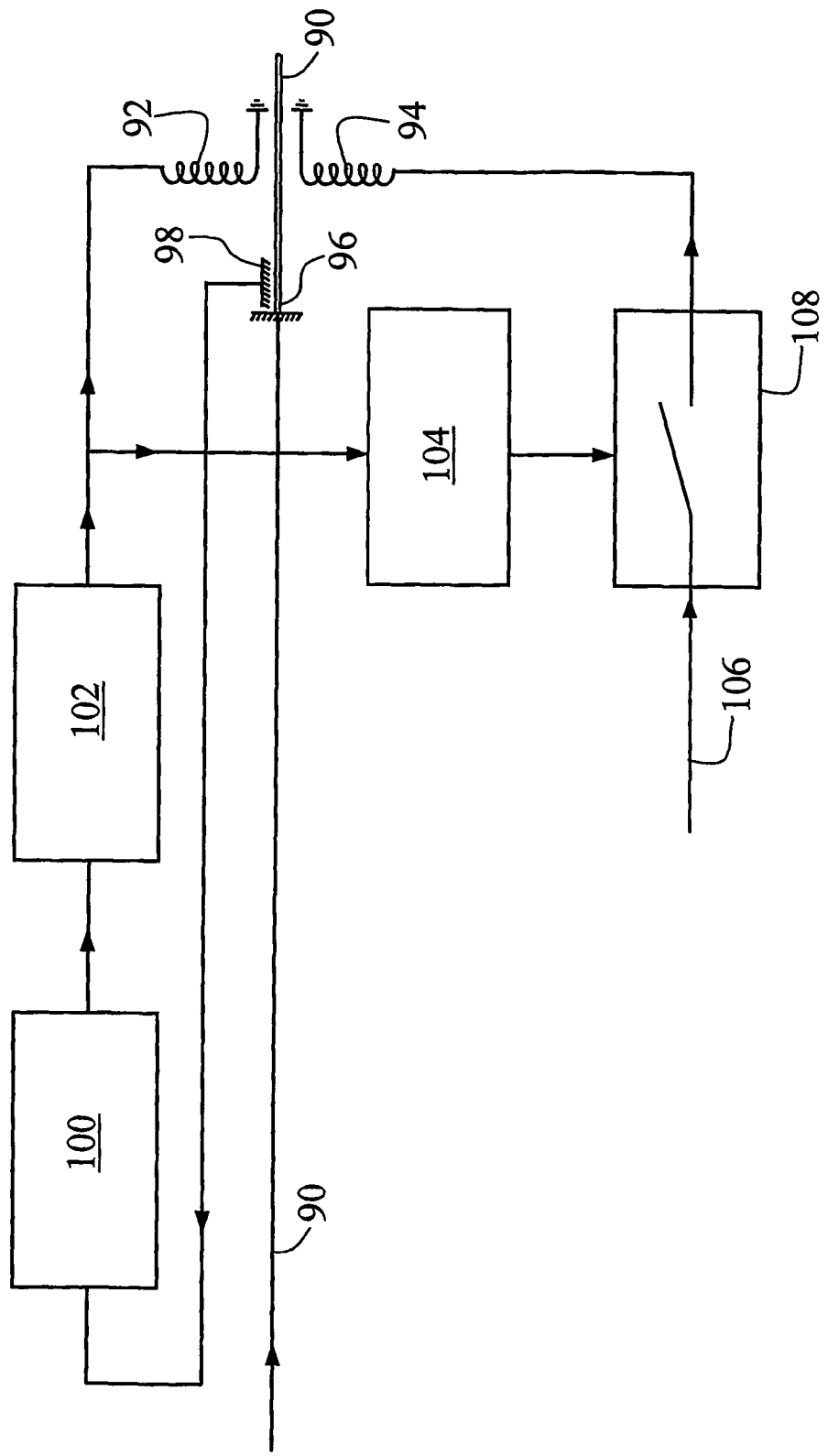
FIG. 5 is a schematic circuit diagram of a scanning apparatus of a fourth preferred embodiment of the present invention.

FIG. 5 is a schematic circuit diagram of a scanning apparatus according to a fourth preferred embodiment of the present invention, for performing the various scanning methods of the above described embodiment.

The apparatus includes a light transmission means in the form of optical fibre 90 that can be deflected in both X and Y directions as a symmetrical cantilever. It is the tip of this optical fibre 90 that, in resonant operation, describes the elliptical pattern detailed above. The optical fibre 90 delivers light from a suitable source (such as a laser or light emitting diode) downstream of the optical fibre 90 but omitted from this figure for the sake of clarity. The scanning apparatus including optical fibre 90 may form a portion of an endoscope, microscope or endomicroscope.

A forward portion of optical fibre 90 is located adjacent an X driving coil 92 and a Y driving coil 94, these coils arranged mutually perpendicularly. The optical fibre 90 is provided either with a magnet attached to the fibre adjacent to and acted on by the coils 92, 94 or, alternatively, by coating the optical fibre 90 with a magnetic material (including, for example, certain paints), so that the forces produced by these coils 92 and 94 can drive the optical fibre 90.

Located toward the rearward end 96 of the movable portion of optical fibre 90 is a piezoelectric X sensor 98 for producing a voltage according to the deflection of the optical fibre 90. The output of X sensor 98 is ultimately applied to the X driving coil 92, but is first phase adjusted by phase shifter 100 and amplified by signal processing amplifier 102. If the loop gain is sufficient and the phase correctly adjusted by phase adjuster 100, the resulting oscillation causes the tip of optical fibre 90 of the cantilever to vibrate in the X direction. The adjustable phase shifter 100 is included so that the frequency of oscillation can be suitably positioned on the mechanical resonance curve, and to compensate for any phase shift in the X sensor 98.

The amplifier 102 also performs some signal processing so that its output is a square wave of adjustable amplitude. This allows direct control of the vibration amplitude, and the square wave is also useful in the generation of the Y drive signal (see FIGS. 2 to 4) for the Y driving coil 94.

The Y drive signal has a phase that is appropriate to obtain the elliptical motion described above. This is achieved with an adjustable delay 104 of the square wave used for driving the X driving coil 92. The required sweeping amplitude is obtained by using this signal to switch a standard Y sawtooth signal 106, as described above and illustrated in FIGS. 2 to 4. This signal is then applied to the Y driving coil 94. The circuit also includes a switch 108 for switching the Y drive signal on or off.

Figure 6:
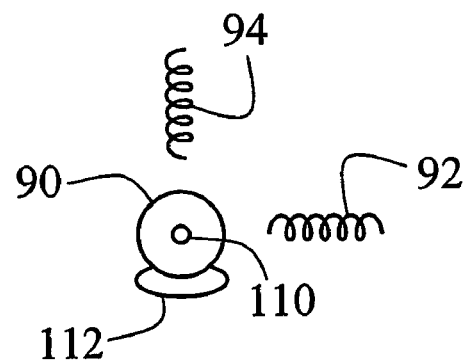
FIG. 6 is a diagram of the coil driving mechanisms of the apparatus of FIG. 5.

FIG. 6 is an end view (that is, viewed from right to left in FIG. 5) of the tip of optical fibre 90 and the X and Y driving coils 92 and 94. In this figure can also be seen the core 110 of optical fibre 90, as well as the magnet 112 attached to the optical fibre 90 so that the X and Y driving coils 92, 94 can drive optical fibre 90. The use of a magnet allows small adjustments to be made to the position of the magnet 112 on fibre 90 and thereby to the resonance condition of the fibre 90. Owing to the greater mass of magnet 112 (when compared with other embodiments such as a painted metallic coating), the driving coils 92, 94 can be relatively small, though at the expense of having a larger and more massive fibre/magnet combination.

Figure 7:
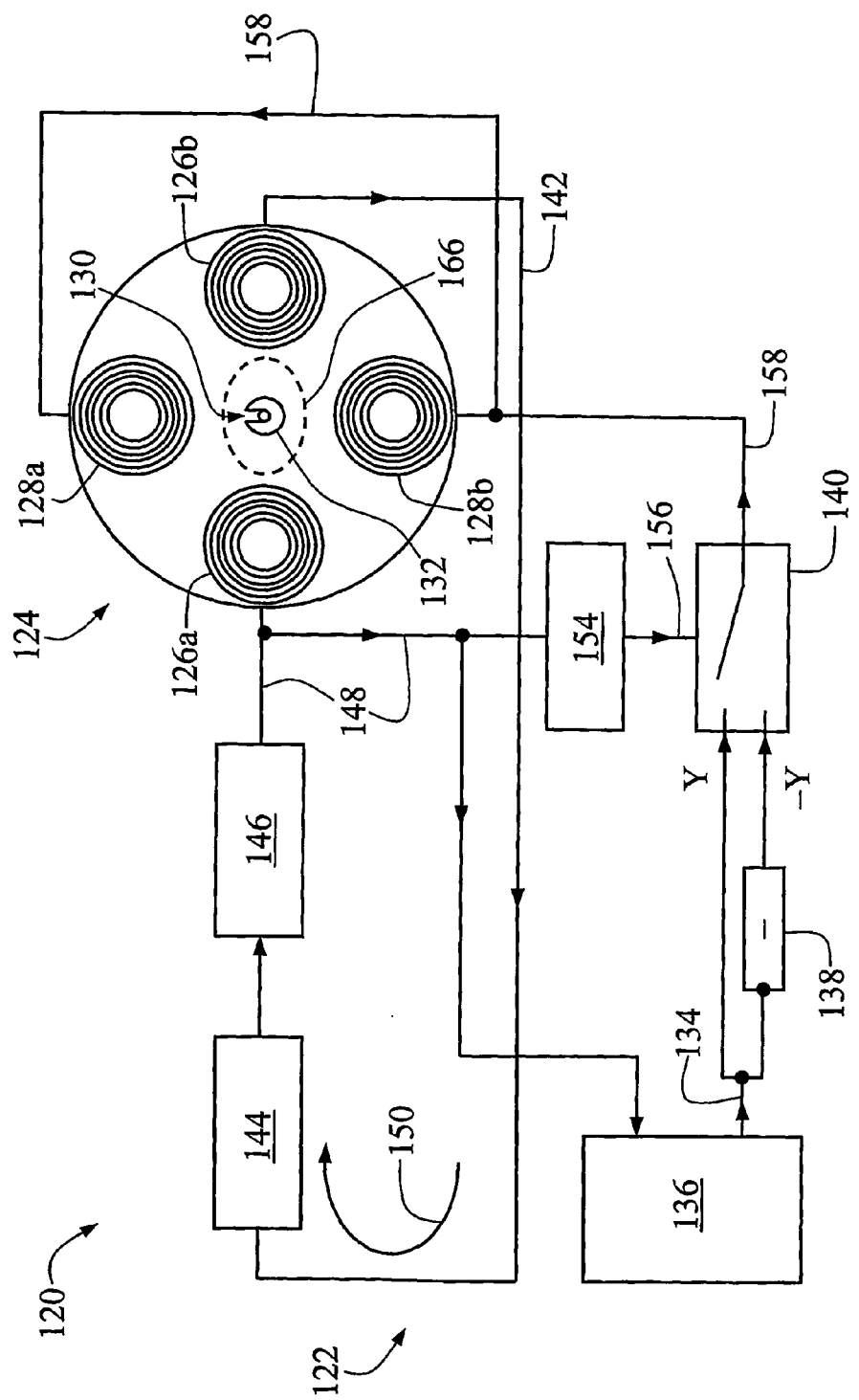
FIG. 7 is a schematic diagram of a scanning apparatus, including associated electronics, according to a fifth preferred embodiment of the present invention.

FIG. 7 is a schematic diagram of a scanning apparatus 120, including associated electronics 122, according to a fifth preferred embodiment of the present invention, for performing the various scanning methods of the above described embodiments.

In this embodiment, the scanning apparatus 120 (seen end-on in this view) includes a scanning mechanism 124 provided with two X solenoids or coils 126a,b and two Y solenoids or coils 128a,b, a light transmitting means in the form of optical fibre 130, and axially magnetised permanent magnet 132. The coils 126a,b and 128a,b are located symmetrically about fibre 130, while magnet 132 is mounted as a collar on fibre 130 and held in place by means of glue. The precise location of magnet 132 is discussed in greater detail below by reference to FIG. 9A.

The two X coils 126a,b are respectively an X drive coil 126a and an inductive X sensing coil 126b. The two Y coils 128a,b are both drive coils.

In broad terms, the two Y drive coils 128a,b are connected in series and driven such that: (a) force is applied to the magnet 132 and hence to fibre 130 either simultaneously upwards or downwards (in the view of FIG. 7), and (b) the signals thereby induced into the X sensing coil 126b cancel.

For small deflections, the forces from the two Y coils 128a,b cancel in the X direction. With one Y coil (as in the embodiment of FIG. 5), the desired modulation of the elliptical scanning pattern can be obtained, but with greater difficulty owing to a significant resolved force component in the X direction during parts of the X scan. Thus, the two diametrically opposed Y coils 128a,b provide both electrical and mechanical balance with respect to the X scan.

The drive for the Y coils 128a,b is generated by switching between a positive and a negative version of the standard Y sawtooth. This sawtooth Y signal 134 (shown in FIG. 8A) is provided by the imagining electronics 136; a signal inverter 138 provides the negative version –Y of that signal. As is discussed in greater detail below, a switch 140 is used to switch between Y and –Y.

Figure 8A:
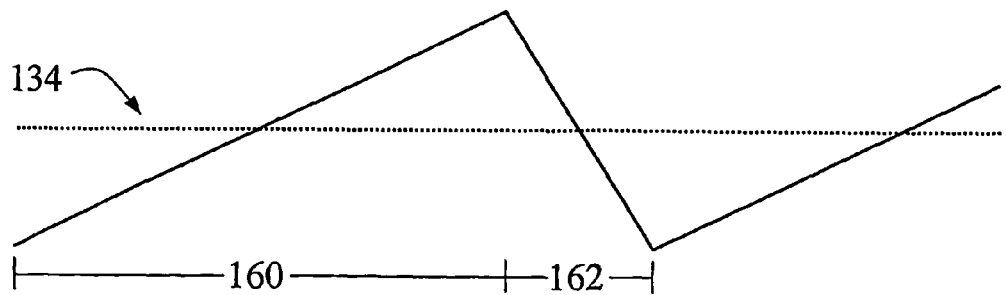
FIG. 8A is a schematic diagram of a sawtooth Y signal provided by the imaging electronics of the apparatus of FIG. 7.
Figure 8B:
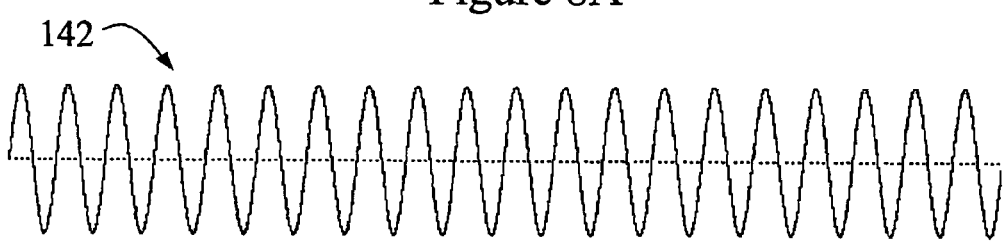
FIG. 8B is a schematic diagram of an X sensing signal that is a function of the position of the magnet of the apparatus of FIG. 7.
Figure 8C:
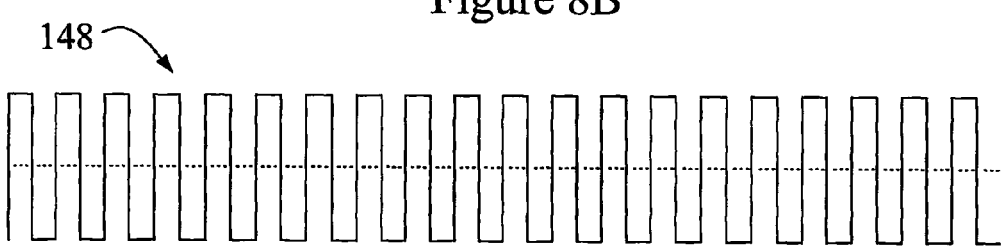
FIG. 8C is a schematic diagram of the X drive input signal of the apparatus of FIG. 7.

As the Y coils 128a,b are driven upwards and downwards, thereby providing the Y scan, X sensing coil 126b outputs an X sensing signal 142 (essentially sinusoidal in appearance, as shown in FIG. 8B) that is a function of the position of the magnet 132 (and hence fibre 130). X sensing signal 142 is phase adjusted by phase adjuster 144 (to provide an elliptical scan) and then into amplifier 146. The output of amplifier 146 is the X drive input signal 148 (shown schematically in FIG. 8C) of X drive coil 126a. The output of amplifier 146 has a maximum voltage, so the resulting oscillating feedback loop 150 (including X sensing coil 126b, phase adjuster 144 and amplifier 146) is ultimately limited to providing an input signal 148 to X drive coil 126a that cannot exceed that maximum. This feedback loop 150 has sufficient gain to oscillate only when mechanical resonance occurs; hence, the loop runs at a frequency determined by the mechanics of the scanning mechanism 124 and the electronic phasing.

The input signal 148 to the X drive coil 126a can then be used to generate the necessary image synchronising for the fast or X scan. The imaging electronics in turn can generate the slow Y can or sweep at a rate determined by the number of lines required in the image, or equivalently the image rate per second.

Figure 8D:
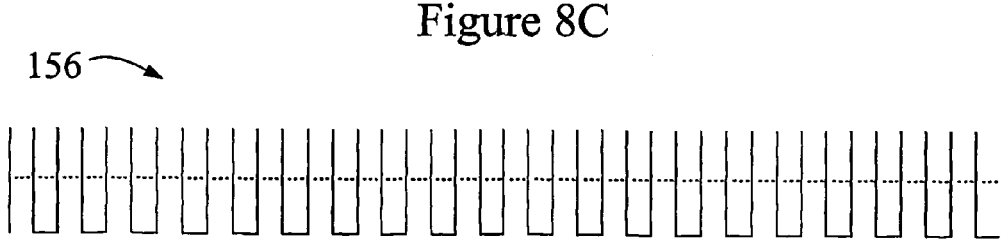
FIG. 8D is a schematic diagram of a switch control signal of the apparatus of FIG. 7.
Figure 8E:
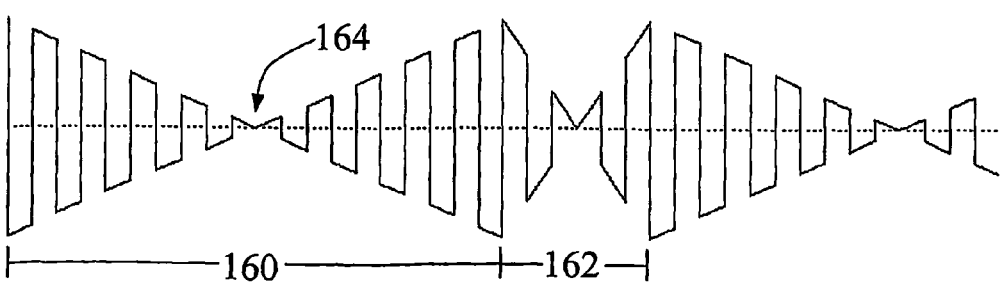
FIG. 8E is a schematic diagram of the Y drive input signal of the apparatus of FIG. 7.

As mentioned above, the Y drive signal is obtained by switching between a positive and a negative version of the standard Y sawtooth signal 134 shown in FIG. 8A. This switching is performed by switch 140, which is controlled by a signal generated by delaying the X drive input signal 148. X drive input signal 148 is fed into delay 154, which outputs the switch control signal 156 (depicted in FIG. 8D) suitably phase adjusted so that the elliptical scan path of the tip of fibre 130 has a stationary major axis. This switch control signal 156 then controls switch 140 to alternative been sawtooth Y signal 134 and –Y at the rate of the X drive input signal, and the resulting output signal from switch 140 is the ultimate Y drive input signal 158 applied to the Y coils 128a,b. This Y drive input signal 158 is shown in FIG. 8E.

As the switch 140 is ultimately controlled by the X drive input signal 148 (through delay 154), the X sensor comprising X sensing coil 126b provides both X and Y feedback. Consequently, a Y sensor is not needed in this embodiment.

The X input drive signal 148 is also used as a X synchronisation signal, and fed into the imaging electronics 136. The imaging electronics 136 generates the sawtooth Y signal 134 at a rate determined by the number of lines required in the image, or equivalently the image rate per second.

Referring to FIG. 8A, sawtooth signal 134 has two components: the trace region 160 of positive gradient and a steeper retrace region 162 of negative gradient 162. The former corresponds to the trace portion of a single complete scan (i.e. when image data are collected); the latter portion corresponds to the retrace portion of the scan when data is generally not collected, and can hence be of shorter duration. In principle the retrace portion should be completed as quickly as possible (cf. FIG. 2), but this retracing is not performed too quickly in this embodiment lest the fibre 130 "bounce" upon return its return to the position corresponding to the scan starting position.

Referring to FIG. 8E, these trace and retrace regions have corresponding regions in the Y drive input signal 158 as shown in FIG. 8E; the point of the Y drive input signal 158 corresponding to the centre of the scan is also indicated at 164.

The envelope 166 of the resulting scan of the fibre 130 within the space defined by the X and Y coils 126a,b and 128a,b is indicated in FIG. 7; it will be understood that the tip of fibre 130, as it extends beyond the drive coils, will generally have larger envelope of motion than envelope 166.

It will also be appreciated by those in the art that, because X coils 126a,b and Y coils 128a,b are identical, it is a straightforward matter to swap X and Y axes. Electronics 122 can be modified by the addition of a suitable switch and minor duplication of some of its circuitry so that the coils 126a,b act as Y drive coils and coils 128a,b act—respectively—as an X drive coil and an X sensing coil. The apparatus 120 then functions as described above, except that the X and Y directions are swapped. In prior art systems, scans in perpendicular directions can only be obtained by manually rotating the scanning apparatus. In hand-held devices, the operator manually twists the hand-piece, requiring in some cases substantial dexterity and generally with considerable imprecision. The symmetry of the scanning mechanism 124 of FIG. 7 allows such an operation to be performed without either impediment.

It should also be noted that the basic scanning mechanism of FIG. 7 could be used to provide other scan patterns, if operated with suitable electronics. It need not be operated resonantly and it need not be limited to elliptical scan envelopes. For example, resonant and non-resonant scan patterns could be generated, including (in addition to the aforementioned elliptical—including circular—scan patterns) spiral patterns and figure eight scan patterns.

FIG. 9A is a partial cross-sectional view of an endoscope head 168 provided with scanning mechanism 124 inside the endoscope head casing 170 (of internal diameter 4.45 mm and external diameter 4.71 mm), in which are visible the relative positions of the Y drive coils 128a,b, fibre 130 and magnet 132. It will be seen that the tip 172 of the fibre 130 executes a path of greater size that the portion 174 of the fibre 130 located between the Y drive coils 128a,b.

Each of the X and Y coils 126a,b and 128a,b has a diameter of 1.45 mm with a core diameter of 0.60 mm.

The length of the vibrating portion of the fibre 130 is 12.5 mm; the fibre's diameter is 0.125 ml. The magnet 132 has a length of 2 mm and diameter of 0.48 mm. The distance from the base of the fibre 130 to the magnet 132 is 2 mm. The resonant frequency of the fibre 130 plus magnet 132 assembly can be set so as not to differ greatly from that of the fibre 130 alone, by adjustment of its location on the fibre 130. The fibre 130 is fixed at its base 174 centrally in an end plate 176 of the endoscope head 168; the end plate 176—and hence the length of the base 174 of the fibre 130 anchoured in the end plate 176—is 3 mm.

The end plate 176 acts as an anchour for base 174 of fibre 130; it secures the fibre but can also influence the vibration of the fibre. For this reason, it may be desirable to provide an optional collar around the fibre 130 abutting and forward (i.e. to the right in this figure) of the end plate 176. This collar could either have a simple circular aperture in which the fibre 130 is secured. Referring to the end view of FIG. 9B, such a collar 177 could instead be provided with a cut-out or slot 178 aligned in the X direction so that the collar 177 in fact comprises two D-shaped portions 179a,b clamping the fibre 130 therebetween. The cut-out or slot 177 would then encourage vibration in the X direction (i.e. that of the fast scan), thereby reducing bias with a component in the Y direction.

The X and Y coils 126a,b and 128a,b each have a diameter of 1.3 mm and length of 2 mm.

In tests of this embodiment performed by the inventors, resonance at an X drive input signal frequency (cf. FIG. 8C) of 611 Hz was achieved; this also implies the same frequency for the high frequency component of the Y drive input signal 158 (cf. FIG. 8E). Peak-to-peak fibre tip deflection was 4.0 mm. The resonant frequency of the mechanism 124 but without magnet 132 was found to be 642 Hz.

Generally speaking, resonant frequency increases as the size of the scanning mechanism 124 is reduced. Calculations suggest that—even with the version shown in FIG. 9A—higher frequencies could be obtained (if desired) by providing attachment between the fibre 130 and magnet 132 over the entire length of the magnet. Higher resonant frequencies could also be obtained by increasing the effective diameter and hence mass of fibre 130 by adding a "collar" or a "capillary" around it in the region immediately forward of its base 174 or underneath the magnet 132. For example, these portions of fibre 130 could be increased in effective diameter to ~0.250 mm. Furthermore, higher resonant frequencies could be obtained by tapering the fibre 130 towards its tip 172. Further modifications of the resonant frequency can also be effected by adjusting other mechanical properties of the mechanisms (such as the length or mass of the magnet).

Further, in the above discussion references to resonant frequency refer to the fundamental resonance frequency. Nevertheless, the scanning mechanism of the various embodiments could also be operated in first and second harmonic frequency modes (as have been tested by the present inventors) and, by straightforward adjustment, in higher order modes. In each case, the mechanism remains resonant and hence stores mechanical energy leading to reduced jitter and greater stability.

Referring to FIG. 9C, in an alternative configuration of this embodiment, magnet 132 is located forward of the coils, so that the X and Y coils 126a,b and 128a,b are not required to accommodate the magnet 132. Consequently, Y drive coils 128a,b can be located more closely to each other (as, though not shown, are X drive coils 126a,b) and the overall diameter of the casing 170 can be reduced. This configuration permits the provision of an endoscope head of reduced diameter.

Figure 10A:
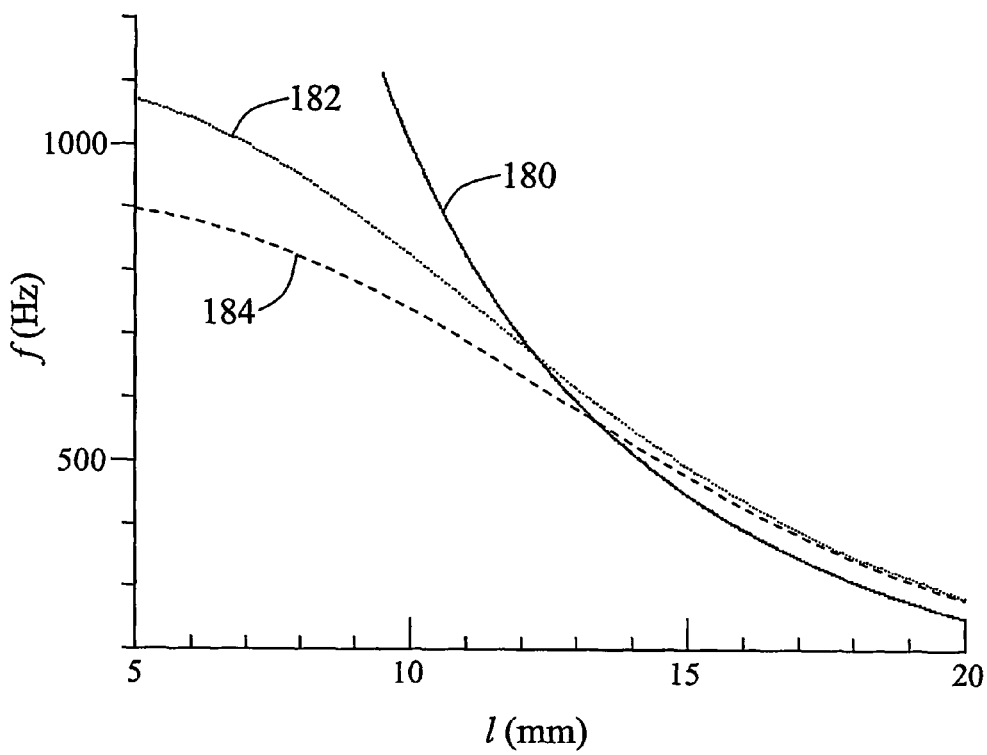
FIG. 10A depicts plots of resonant frequency against fibre length for the apparatus of FIG. 7, without a magnet, with a magnet of 2 mm length and 0.40 mm diameter, and with a magnet of 2 mm length and 0.48 mm diameter.

Various tests have also been performed to ascertain the characteristics of scanning mechanism 124. FIG. 10A depicts plots of resonant frequency f(Hz) against fibre length l(mm), without a magnet (solid curve 180), with a magnet of 2 mm length and 0.40 mm diameter (dotted curve 182), and with a magnet of 2 mm length and 0.48 mm diameter (dashed curve 184). In each case the length of the base of the fibre was 2 mm and the fibre had a diameter of 0.125 mm.

Figure 10B:
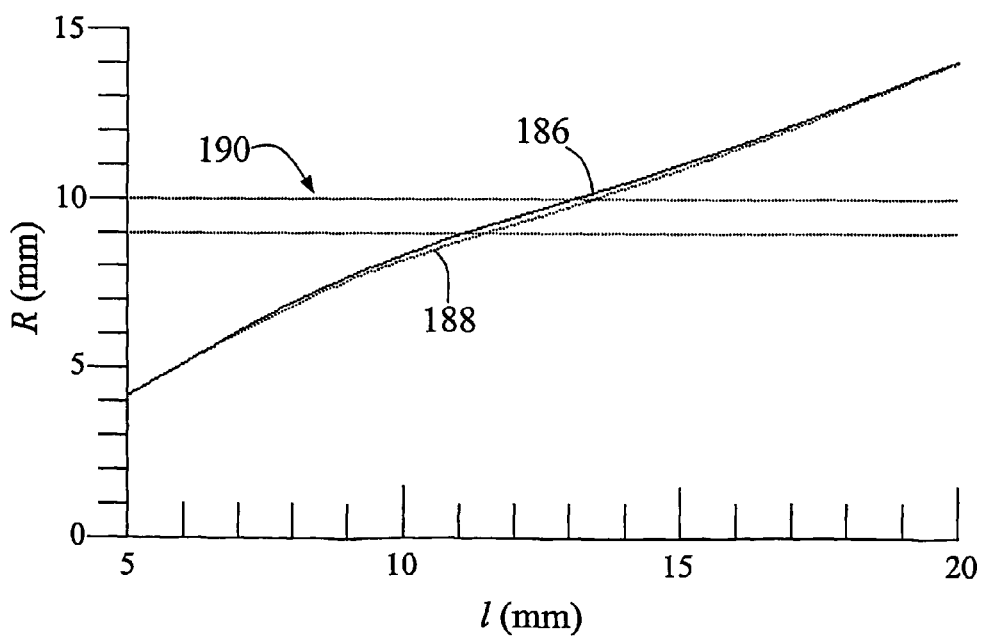
FIG. 10B depicts plots of radius of tip movement against fibre length for the apparatus of FIG. 7, for a magnet of 2 mm length and 0.48 mm diameter and of 2 mm length and 0.40 mm diameter.

FIG. 10B depicts plots of radius of the tip movement R(mm) against fibre length l(mm) for a magnet of 2 mm length and 0.48 mm diameter (solid curve 186) and 0.40 mm diameter (dotted curve 188). (The region 190 bounded by horizontal dotted lines R=9 mm and R=10 mm represents the range of tip movement obtained with certain prior art scanning mechanisms that employ a tuning fork to provide the fast or X scan.)

Figure 10C:
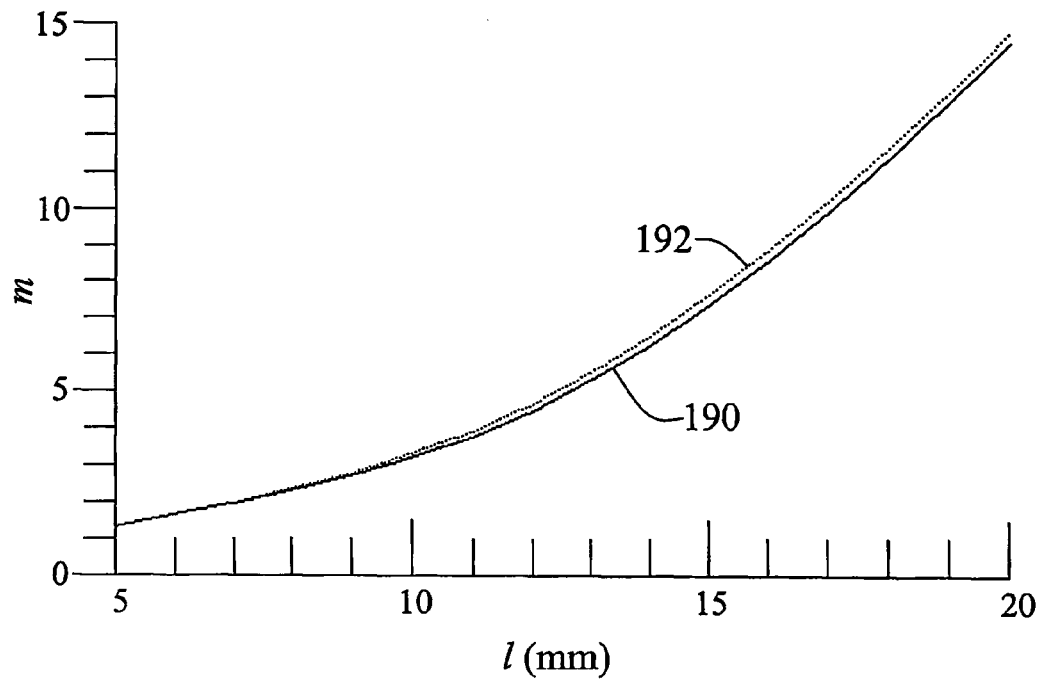
FIG. 10C depicts plots of mechanical magnification (calculated as the ratio of fibre tip deflection to magnet deflection) against fibre length, for a magnet of 2 mm length and 0.48 mm diameter and of 2 mm length and 0.40 mm diameter.

FIG. 10C depicts plots of mechanical magnification m (calculated as the ratio of fibre tip deflection to magnet deflection) against fibre length l(mm), for a magnet of 2 mm length and 0.48 mm diameter (solid curve 190) and 0.40 mm diameter (dotted curve 192).

Figure 11:
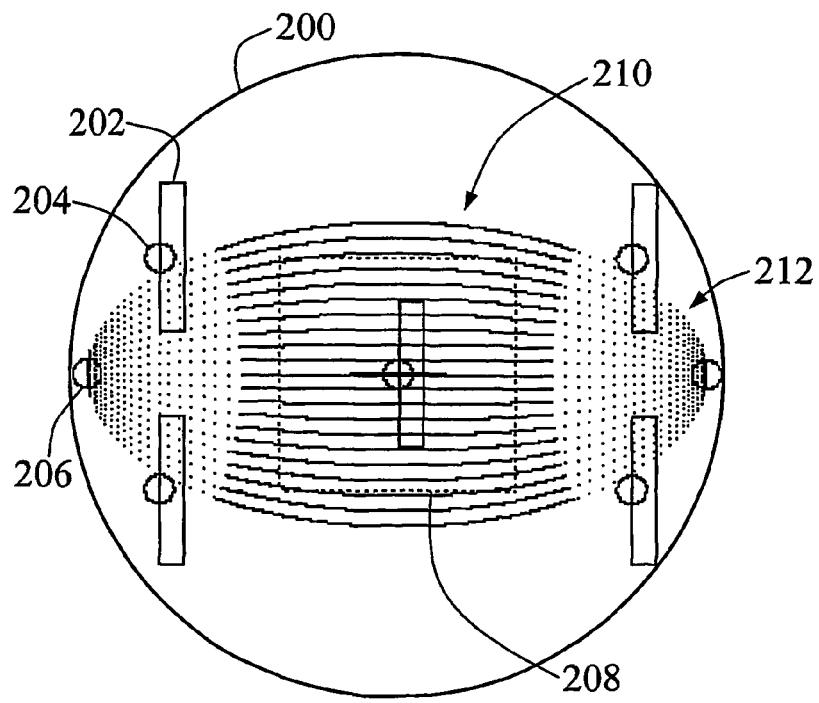
FIG. 11 depicts the results of a theoretical comparison of scan areas obtained for raster patterns obtained with a prior art tuning-fork type scanning mechanism and with an apparatus comparable to that of FIG. 7.
Figure 12:
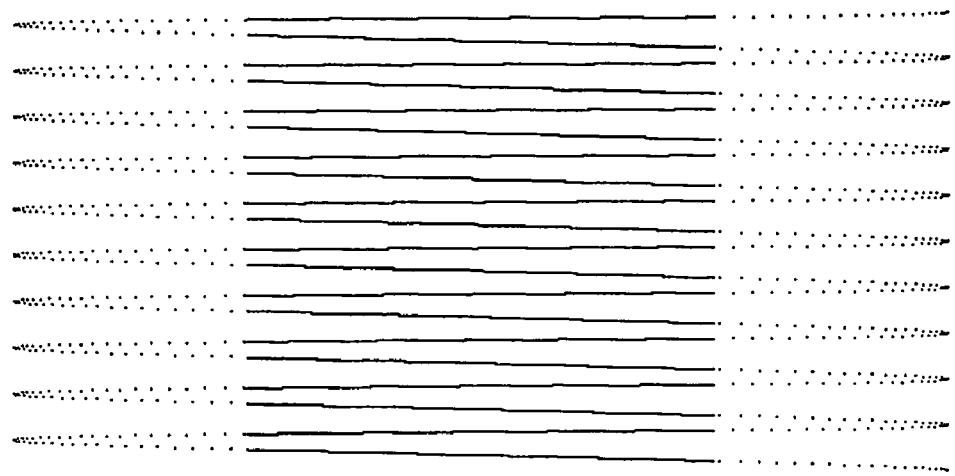
FIG. 12 is a schematic diagram of a prior art resonant X, sawtooth Y scan in which solid curves indicate the imaged scan area and dashed curves the discarded scan area.

FIG. 11 depicts the results of a theoretical comparison of scan areas that could be obtained for raster patterns obtained with a prior art tuning-fork type scanning mechanism and with an apparatus comparable to that of FIG. 7, in order to compare the scan areas available to the optics of, for example, an endoscope. The scan areas were defined by the scan speed criterion, set by the 2:1 rule in the sine-linear model (that is, the square area of half the peak to peak X mechanical deflection, and the peak to peak Y deflection).

This is referred to above as the "87% rule", in which image data are not gathered when scanning speed drops below 87% of peak speed.

In FIG. 11, it can be seen that the endoscope head 200 (set to an internal diameter of 2.75 mm) delimits the motion of both the prior art tuning fork tine 202 (on which is mounted optical fibre tip 204) and the elliptically scanned optical fibre tip 206 of an embodiment of the present invention. It will be noted that tine 202 is depicted in five positions, including a central (at rest) position and four extremes of its motion. The upper and lower right extremes of motion of tine 202 (as seen in this figure) are fixed by the endoscope head 200; for a symmetrical scan of the fibre tip 204, the left excursion has some clearance compared with the right so the upper and lower left extremes of motion of tine 202 are somewhat within the confines of endoscope head 200.

The result for the tine 202 of the prior art tuning fork scanning mechanism is a familiar 2:1 square-in-rectangle diagram, that is, the mechanics of this arrangement define a rectangular scan (defined by the extreme positions of the fibre tip 204) and, owing to the 87% speed rule, the optics define a square, usable scan area (indicated by dashed square 208) within that rectangle. The peak-to-peak X deflection of the tine 202 was 2.0 mm, the peak-to-peak Y deflection 1.0 mm. The image area (i.e. of square 208) for this arrangement was thus 1.00 mm$^2$.

The fibre tip 206 of the embodiment of the present invention also touches the endoscope head 200, which thus delimits its maximum motion. The peak-to-peak deflection of the fibre tip 206 can be essentially the entire internal diameter of the endoscope head (or more exactly the endoscope head internal diameter minus the fibre external diameter); as no tine is involved, the modulated elliptical scan can therefore cover more area that the prior art arrangement. Usable imaging area is also greater: scanning speed above 87% of peak speed is denoted by solid curves 210, while lower speeds are shown by means of dotted curves 212.

It will be seen that the scan area of the modulated elliptical scan is greater than that of the fibre tip 204 mounted on tine 202. This is due in part to the more compact size of a fibre alone (compared with the prior art fibre/tine combination), but also to the higher strain that the silica of the fibre of the inventive embodiment can withstand relative to the steel of the prior art tine, even at the same frequency.

Modifications within the scope of the invention may be readily effected by those skilled in the art. For example, while, according to the present invention, eccentricity or minor axis are adjusted to achieve the scanning pattern, in some embodiments it may be desirable also to modulate the radius during operation. It is to be understood, therefore, that this invention is not limited to the particular embodiments described by way of example herein above.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A method of scanning a light transmitter having an exit tip, comprising moving said tip in an elliptical pattern while varying the eccentricity of said elliptical pattern.

2. A method as claimed in claim 1, including varying said eccentricity by varying the length of one axis of said elliptical pattern.

3. A method as claimed in claim 2, including varying said eccentricity by varying the length of the minor axis of said elliptical pattern.

4. A method as claimed in claim 1, wherein said elliptical pattern has a major axis and minor axis in the ratio of approximately two.

5. A method as claimed in claim 1, wherein said light transmitter is an optical fiber.

6. A method as claimed in claim 1, including driving said light transmitter magnetically.

7. A method as claimed in claim 6, including driving said light transmitter with a magnet attached to said light transmitter, wherein said magnet is magnetised axially and acted on by mutually perpendicular coils or windings.

8. A scanning apparatus, comprising:
a light transmitter having an exit tip;
first and second drives for resonantly driving said light transmitter in orthogonal directions;
wherein said first and second drives are operable to move said tip in an elliptical pattern while varying the eccentricity of said elliptical pattern.

9. An apparatus as claimed in claim 8, wherein said apparatus is operable to vary said eccentricity by varying the length of one axis of said elliptical pattern.

10. An apparatus as claimed in claim 8, wherein said apparatus is operable to vary said eccentricity by varying the length of the minor axis of said elliptical pattern.

11. An apparatus as claimed in claim 8, wherein said first and second drives are in the form of a magnetic drive for driving said light transmitter.

12. An apparatus as claimed in claim 11, wherein said magnetic drive (i) a magnet attached to said light transmitter and (ii) mutually perpendicular coils or windings, wherein said magnet is magnetised axially and acted on by said mutually perpendicular coils or windings.

13. An optical fiber endoscope, microscope or endomicroscope including a scanning apparatus as claimed in claim 8.

14. An optical fiber confocal endoscope, microscope or endomicroscope including a scanning apparatus as claimed in claim 8.

15. A scanning apparatus comprising:
an X drive for driving a light transmitter having an exit tip in an X direction;
a Y drive for driving said light transmitter in a Y direction;
an X drive input signal generator for providing an X drive input signal; and
a Y drive input signal generator for providing a Y drive input signal modulated by a modulating signal derived from said X drive input signal;
wherein said apparatus is operable to scan said exit tip in an elliptical scan pattern with varying eccentricity when said exit tip is driven simultaneously by said X drive and said Y drive.

16. A scanning apparatus as claimed in claim 15, wherein:
said X drive input signal comprises a square wave signal; and
said Y drive input signal generator is configured to provide a sawtooth signal modulated by said modulating signal.

17. An apparatus as claimed in claim 16, wherein said Y drive input signal generator is operable to generate said sawtooth signal such that said sawtooth signal is repeatedly inverted according to a trigger signal comprising a delayed version of said X drive input signal.

18. An apparatus as claimed in claim 17, wherein said apparatus is operable to collect image data from said central portion of said scan pattern corresponding to an exit tip speed of greater than or equal to approximately 87% of a peak exit tip speed.

19. An apparatus as claimed in claim 15, wherein said scan pattern is elliptical and has an eccentricity that is always greater than zero.

20. An apparatus as claimed in claim 15, wherein said X drive and said Y drive are in the form of a magnetic drive comprising (i) a magnet attached to said light transmitter and (ii) mutually perpendicular coils or windings, wherein said magnet is magnetised axially and acted on by said mutually perpendicular coils or windings and said mutually perpendicular coils or windings comprise a pair of drive coils located symmetrically each on opposite sides of a rest position of said magnet in a first plane, and a further drive coil located in a second plane perpendicular to said first plane, and said apparatus further comprises a sensing coil for sensing the position of said magnet and located in said second plane symmetrically opposite said magnet from said further drive coil, wherein each of said pair of coils, said further coil and said sensing coil are equidistant from said magnet in said rest position, said sensing coil is operable to output an output signal indicative of said position of said magnet, and said apparatus is operable to derive an input signal for said further coil from said output signal.

21. An apparatus as claimed in claim 20 wherein said apparatus is operable to control a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, wherein said apparatus can perform a further scan perpendicular to said scan pattern.

22. An optical fiber endoscope, microscope or endomicroscope including a scanning apparatus as claimed in claim 15.

23. An optical fiber confocal endoscope, microscope or endomicroscope including a scanning apparatus as claimed in claim 15.

24. A method of scanning a light transmitter having an exit tip, comprising moving said tip in an elliptical pattern while varying the eccentricity of said elliptical pattern, and repeatedly varying said eccentricity between a minimum value and one.

25. A method of scanning a light transmitter having an exit tip, comprising moving said tip in an elliptical pattern while varying the eccentricity of said elliptical pattern, and repeatedly varying said eccentricity from a minimum value to one and then back to said minimum value, whereby a portion of said pattern centered on the center of said elliptical pattern approximates a raster pattern.

26. A method of scanning a light transmitter having an exit tip, comprising moving said tip in an elliptical pattern while varying the eccentricity of said elliptical pattern, and modulating said eccentricity by modulating the minor axis of said elliptical pattern between positive and negative extremes, so that said tip moves in both clockwise and counterclockwise directions in the course of a single complete scan.

27. A method of scanning a light transmitter having an exit tip, comprising moving said tip in an elliptical pattern while varying the eccentricity of said elliptical pattern, driving said tip with an X drive parallel to the major axis of said elliptical pattern and with a Y drive parallel to the minor axis of said elliptical pattern, and synchronising at a constant phase to the X scan to allow interfacing to a standard raster display.

28. A method as claimed in claim 27, including deriving said Y drive by synchronously switching a delayed version of said X drive.

29. A method of scanning a light transmitter having an exit tip, comprising:
  moving said tip in an elliptical pattern while varying the eccentricity of said elliptical pattern;
  driving said light transmitter magnetically with a magnet attached to said light transmitter, wherein said magnet is magnetised axially and acted on by mutually perpendicular coils or windings that comprise a pair of drive coils located symmetrically each on opposite sides of a rest position of said magnet in a first plane, and a further drive coil located in a second plane perpendicular to said first plane;
  sensing the position of said magnet with a sensing coil located in said second plane symmetrically opposite said magnet from said further drive coil;
  obtaining an output signal from said sensing coil indicative of said position of said magnet; and
  deriving an input signal for said further drive coil from said output signal; wherein each of said pair of drive coils, said further drive coil, and said sensing coil are equidistant from said magnet in said rest position.

30. A method as claimed in claim 29, further including controlling a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, whereby a further scan can be performed perpendicular to said elliptical pattern.

31. A method of scanning a light transmitter having an exit tip, comprising moving said tip in an elliptical pattern while varying the eccentricity of said elliptical pattern, including driving said light transmitter magnetically, wherein said light transmitter is provided with a coat of magnetic material or located within a close-fitting magnetic tube.

32. A scanning apparatus, comprising:
  a light transmitter having an exit tip; and
  first and second drives for resonantly driving said light transmitter in orthogonal directions;
  wherein said first and second drives are operable to move said tip in an elliptical pattern while varying the eccentricity of said elliptical pattern, and said apparatus is operable to repeatedly vary said eccentricity between a minimum value and one.

33. A scanning apparatus, comprising:
  a light transmitter having an exit tip; and
  first and second drives for resonantly driving said light transmitter in orthogonal directions;
  wherein said first and second drives are operable to move said tip in an elliptical pattern while varying the eccentricity of said elliptical pattern,
  wherein said apparatus is operable to repeatedly vary said eccentricity from a minimum value to one and then back to said minimum value, and
  wherein a portion of said pattern centered on the center of said elliptical pattern approximates a raster pattern.

34. A scanning apparatus, comprising:
a light transmitter having an exit tip;
first and second drives for resonantly driving said light transmitter in orthogonal directions;
wherein said first and second drives are operable to move said tip in an elliptical pattern while varying the eccentricity of said elliptical pattern, and
wherein said apparatus is operable to modulate said eccentricity by modulating the minor axis of said elliptical pattern between positive and negative extremes, so that said tip moves in both clockwise and counterclockwise directions in the course of a single complete scan.

35. A scanning apparatus, comprising:
a light transmitter having an exit tip; and
first and second drives for resonantly driving said light transmitter in orthogonal directions;
wherein said first and second drives are operable to move said tip in an elliptical pattern while varying the eccentricity of said elliptical pattern,
wherein said first drive comprising an X drive for driving said tip parallel to the major axis of said elliptical pattern and said second drive comprising a Y drive for driving said tip parallel to the minor axis of said elliptical pattern, and
wherein said apparatus is operable to synchronise at a constant phase to the X scan to allow interfacing to a standard raster display.

36. An apparatus as claimed in claim 35, wherein said Y drive is derived by synchronously switching a delayed version of said X drive.

37. A scanning apparatus, comprising:
a light transmitter having an exit tip; and
a magnetic drive for resonantly driving said light transmitter in orthogonal directions and operable to move said tip in an elliptical pattern while varying the eccentricity of said elliptical pattern, said magnetic drive comprising (i) a magnet attached to said light transmitter and (ii) mutually perpendicular coils or windings, said magnet being magnetised axially and acted on by said mutually perpendicular coils or windings;
wherein said mutually perpendicular coils or windings comprise a pair of drive coils located symmetrically each on opposite sides of a rest position of said magnet in a first plane, and a further drive coil located in a second plane perpendicular to said first plane, and
wherein said apparatus further comprises a sensing coil for sensing the position of said magnet and located in said second plane symmetrically opposite said magnet from said further drive coil,
wherein each of said pair of coils, said further coil and said sensing coil are equidistant from said magnet in said rest position, said sensing coil is operable to output an output signal indicative of said position of said magnet, and
wherein said apparatus is operable to derive an input signal for said further coil from said output signal.

38. An apparatus as claimed in claim 37, wherein said apparatus is operable to control a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, wherein said apparatus can perform a further scan perpendicular to said elliptical pattern.

39. A scanning apparatus, comprising:
a light transmitter having an exit tip; and
a magnetic drive for resonantly driving said light transmitter in orthogonal directions and operable to move said tip in an elliptical pattern while varying the eccentricity of said elliptical pattern;
wherein said light transmitter is provided with a coat of magnetic material or is located within a close-fitting magnetic tube.

40. A scanning apparatus comprising:
an X drive for driving a light transmitter having an exit tip in an X direction;
a Y drive for driving said light transmitter in a Y direction;
an X drive input signal generator for providing an X drive input signal; and
a Y drive input signal generator for providing a Y drive input signal modulated by a modulating signal derived from said X drive input signal;
wherein said exit tip executes a scan pattern when driven simultaneously by said X drive and said Y drive,
said X drive input signal comprises a square wave signal, and
said Y drive input signal generator is configured to provide a sawtooth signal modulated by said modulating signal.

41. An apparatus as claimed in claim 40, wherein said Y drive input signal generator is operable to generate said sawtooth signal such that said sawtooth signal is repeatedly inverted according to a trigger signal comprising a delayed version of said X drive input signal.

42. An apparatus as claimed in claim 41, wherein said apparatus is operable to collect image data from said central portion of said scan pattern corresponding to an exit tip speed of greater than or equal to approximately 87% of a peak exit tip speed.

43. An optical fiber endoscope, microscope or endomicroscope including a scanning apparatus as claimed in claim 40.

44. A scanning apparatus comprising:
a magnetic drive comprising an X drive for driving a light transmitter having an exit tip in an X direction and a Y drive for driving said light transmitter in a Y direction;
an X drive input signal generator for providing an X drive input signal; and
a Y drive input signal generator for providing a Y drive input signal modulated by a modulating signal derived from said X drive input signal;
wherein said exit tip executes a scan pattern when driven simultaneously by said X drive and said Y drive,
wherein said magnetic drive comprises (i) a magnet attached to said light transmitter and (ii) mutually perpendicular coils or windings, wherein said magnet is magnetised axially and acted on by said mutually perpendicular coils or windings and said mutually perpendicular coils or windings comprise a pair of drive coils located symmetrically each on opposite sides of a rest position of said magnet in a first plane, and a further drive coil located in a second plane perpendicular to said first plane,
wherein said apparatus further comprises a sensing coil for sensing the position of said magnet and located in said second plane symmetrically opposite said magnet from said further drive coil, and
wherein each of said pair of coils, said further coil and said sensing coil are equidistant from said magnet in said rest position, said sensing coil is operable to output an output signal indicative of said position of said magnet, and said apparatus is operable to derive an input signal for said further coil from said output signal.

45. An apparatus as claimed in claim 44, wherein said apparatus is operable to control a) said pair of coils in said first plane and b) said further coil and said sensing coil in said second plane, to swap functions so that said pair of drive coils in said first plane act as a drive coil and a sensing coil, and said further coil and said sensing coil in said second plane act as a pair of drive coils, wherein said apparatus can perform a further scan perpendicular to said scan pattern.

46. An optical fiber endoscope, microscope or endomicroscope including a scanning apparatus as claimed in claim 44.

* * * * *